US011112025B2

United States Patent
Bartow et al.

(10) Patent No.: US 11,112,025 B2
(45) Date of Patent: Sep. 7, 2021

(54) WATER VALVE GUIDE TUBE WITH INTEGRATED WELD RING AND WATER VALVE INCORPORATING SAME

(71) Applicants: Shane Duncan Bartow, Bloomingdale, IL (US); Paul Charles Berkley, Shorewood, IL (US); James E. Pearson, Downers Grove, IL (US)

(72) Inventors: Shane Duncan Bartow, Bloomingdale, IL (US); Paul Charles Berkley, Shorewood, IL (US); James E. Pearson, Downers Grove, IL (US)

(73) Assignee: Robertshaw Controls Company, Itasca, IL (US)

( * ) Notice: Subject to any disclaimer, the term of this patent is extended or adjusted under 35 U.S.C. 154(b) by 476 days.

(21) Appl. No.: 15/474,605

(22) Filed: Mar. 30, 2017

(65) Prior Publication Data
US 2018/0283572 A1    Oct. 4, 2018

(51) Int. Cl.
*F16K 31/06* (2006.01)
*B29C 65/00* (2006.01)
(Continued)

(52) U.S. Cl.
CPC ...... *F16K 31/0672* (2013.01); *B29C 65/1635* (2013.01); *B29C 66/112* (2013.01); *B29C 66/114* (2013.01); *B29C 66/131* (2013.01); *B29C 66/24221* (2013.01); *B29C 66/5344* (2013.01); *B29C 66/53421* (2013.01); *B29C 66/543* (2013.01); *B29C 66/5412* (2013.01); *B29C 66/73921* (2013.01); *F16K 7/12* (2013.01); *F16K 7/17* (2013.01); *F16K 31/404* (2013.01); *B29C 65/0672* (2013.01);
(Continued)

(58) Field of Classification Search
USPC ....... 251/129.15, 30.01, 30.02, 30.03, 30.04, 251/30.05
See application file for complete search history.

(56) References Cited

U.S. PATENT DOCUMENTS

| | | | |
|---|---|---|---|
| 2,160,117 A | 5/1939 | Borresen |
| 2,215,954 A | 9/1940 | Borresen |
| (Continued) | | | |

FOREIGN PATENT DOCUMENTS

| | | |
|---|---|---|
| CN | 1153876 A | 7/1997 |
| CN | 101743425 A | 6/2010 |
| (Continued) | | |

OTHER PUBLICATIONS

Espacenet Translation, DE 102005049123 A2 (Year: 2019).*
Solenoids and Actuators, paper, Mar. 3, 2018, 15 pages, V2.01, homepages.which.net/~paul.hills/Solenoids/SolenoidsBody.html—26k.

*Primary Examiner* — Daphne M Barry
(74) *Attorney, Agent, or Firm* — Reinhart Boerner Van Deuren P.C.

(57) ABSTRACT

A water valve, guide tube for a water valve, and associated method are provided. The water valve includes a housing and the guide tube is installed on the housing via laser welding. The guide tube and housing each provide axially facing mating surfaces which abut one another in a pre-bonded configuration. In a post-bonded configuration, a laser weld joint is formed at the interface between the mating surfaces. The joint forms a portion of an outer periphery of the housing.

23 Claims, 4 Drawing Sheets

(51) Int. Cl.
  *B29C 65/16* (2006.01)
  *F16K 7/17* (2006.01)
  *F16K 31/40* (2006.01)
  *F16K 7/12* (2006.01)
  *B29L 31/00* (2006.01)
  *B29C 65/06* (2006.01)
  *B29C 65/08* (2006.01)
  *B29C 65/56* (2006.01)

(52) U.S. Cl.
  CPC .......... *B29C 65/08* (2013.01); *B29C 65/1632* (2013.01); *B29C 65/1648* (2013.01); *B29C 65/1677* (2013.01); *B29C 65/561* (2013.01); *B29C 66/12449* (2013.01); *B29C 66/12469* (2013.01); *B29C 66/929* (2013.01); *B29L 2031/7506* (2013.01)

(56) References Cited

U.S. PATENT DOCUMENTS

| | | |
|---|---|---|
| 2,228,588 A | 1/1941 | Ray |
| 2,398,452 A | 4/1946 | Shaw |
| 2,430,107 A | 11/1947 | Cronrath |
| 2,549,188 A | 4/1951 | Forsnas |
| 2,956,770 A | 10/1960 | Galley |
| 3,082,359 A | 3/1963 | Mangiafico et al. |
| 3,090,592 A | 5/1963 | Fleer |
| 3,263,693 A | 8/1966 | Ages |
| 3,410,301 A | 11/1968 | Merriner et al. |
| 3,603,559 A | 9/1971 | Totten |
| 3,639,870 A | 2/1972 | Benson |
| 3,818,398 A | 6/1974 | Barbier et al. |
| 4,088,975 A | 5/1978 | Lang |
| 4,170,339 A | 10/1979 | Ueda et al. |
| 4,268,009 A | 5/1981 | Allen, Jr. |
| 4,298,020 A | 11/1981 | Inada et al. |
| 4,376,447 A * | 3/1983 | Chumley ............ F16K 1/42 137/244 |
| 4,387,878 A | 6/1983 | Zukausky |
| 4,418,886 A | 12/1983 | Holzer |
| 4,418,888 A | 12/1983 | Jacobson et al. |
| 4,441,521 A | 4/1984 | Brown et al. |
| 4,443,775 A | 4/1984 | Fujitani et al. |
| 4,446,889 A | 5/1984 | Sakakibara et al. |
| 4,483,672 A | 11/1984 | Wallace et al. |
| 4,500,067 A | 2/1985 | Zukausky |
| 4,502,661 A | 3/1985 | Swanson |
| 4,534,537 A | 8/1985 | Zukausky |
| 4,635,494 A | 1/1987 | Conklin |
| 4,884,782 A | 12/1989 | Hensley et al. |
| 4,889,314 A | 12/1989 | Hashizume et al. |
| 4,958,774 A | 9/1990 | Taylor |
| 4,981,155 A | 1/1991 | Pick et al. |
| 5,040,567 A | 8/1991 | Nestler et al. |
| 5,090,441 A | 2/1992 | Richmond |
| 5,140,876 A | 8/1992 | Fields |
| 5,145,145 A | 9/1992 | Pick et al. |
| 5,181,692 A | 1/1993 | Brausfeld |
| 5,363,873 A | 11/1994 | Richmond |
| 5,403,230 A | 4/1995 | Capriglione, Sr. |
| 5,435,519 A | 7/1995 | Everingham |
| 5,599,003 A | 2/1997 | Seemann et al. |
| 5,599,033 A | 2/1997 | Kolbus et al. |
| 5,674,002 A | 10/1997 | Powell et al. |
| 5,709,370 A | 1/1998 | Kah, Jr. |
| 5,762,097 A | 6/1998 | Hettinger et al. |
| 5,808,534 A | 9/1998 | Laffey |
| 5,921,009 A | 7/1999 | Hice |
| 5,941,502 A | 8/1999 | Cooper |
| 5,954,311 A | 9/1999 | Thorpe |
| 6,014,917 A | 1/2000 | Bally et al. |
| 6,076,550 A | 6/2000 | Hiraishi et al. |
| 6,119,966 A | 9/2000 | Wagner et al. |
| 6,149,124 A | 11/2000 | Yang |
| 6,170,516 B1 | 1/2001 | Sakata et al. |
| 6,178,855 B1 | 1/2001 | Bally et al. |
| 6,234,449 B1 * | 5/2001 | Ortner ............ F16K 31/404 251/35 |
| 6,269,834 B1 | 8/2001 | Huhnen |
| 6,311,951 B1 | 11/2001 | Samulowitz |
| 6,318,213 B1 | 11/2001 | Hendrix et al. |
| 6,349,487 B1 | 2/2002 | Hice |
| 6,374,814 B1 | 4/2002 | Cook et al. |
| 6,390,441 B2 | 5/2002 | Koyama et al. |
| 6,439,214 B1 * | 8/2002 | Yew ............ F02M 63/0022 123/568.21 |
| 6,591,797 B2 | 7/2003 | Entzminger |
| 6,684,901 B1 | 2/2004 | Cahill et al. |
| 6,820,621 B2 | 11/2004 | Seuret et al. |
| 6,820,651 B2 | 11/2004 | Seuret et al. |
| 6,830,231 B2 | 12/2004 | Paessler et al. |
| 6,870,454 B1 | 3/2005 | Vladimirescu et al. |
| 7,091,808 B2 | 8/2006 | Okubo |
| 7,111,444 B2 | 9/2006 | Morris et al. |
| 7,172,532 B2 | 2/2007 | Baker |
| 7,226,034 B2 | 6/2007 | Stark et al. |
| 7,226,393 B2 | 6/2007 | Baker |
| 7,275,732 B2 * | 10/2007 | Kato ............ F16K 31/0655 251/129.15 |
| 7,309,303 B1 | 12/2007 | Proctor |
| 7,341,236 B2 | 3/2008 | Stephenson et al. |
| 7,364,533 B2 | 4/2008 | Baker |
| 8,267,375 B1 | 9/2012 | LaHousse et al. |
| 9,228,669 B2 | 1/2016 | Iwata et al. |
| 9,249,895 B2 | 2/2016 | Hettinger et al. |
| 2008/0179556 A1 | 7/2008 | Lasa et al. |
| 2009/0224191 A1 | 9/2009 | Nam |
| 2009/0256093 A1 | 10/2009 | Chen et al. |
| 2010/0019179 A1 | 1/2010 | Nguyen |
| 2010/0038572 A1 | 2/2010 | Alvarez et al. |
| 2010/0086761 A1 | 4/2010 | Okuda |
| 2011/0155931 A1 | 6/2011 | Weiss |
| 2012/0153199 A1 | 6/2012 | Nguyen |
| 2012/0168657 A1 | 7/2012 | Hentschel et al. |
| 2013/0302545 A1 | 11/2013 | Schnelker et al. |
| 2014/0084194 A1 * | 3/2014 | Kibune ............ F16K 27/029 251/129.15 |
| 2017/0015051 A1 | 1/2017 | Kurita |

FOREIGN PATENT DOCUMENTS

| | | |
|---|---|---|
| CN | 106346787 A | 1/2017 |
| DE | 10 2005 049 123 A1 | 10/2006 |
| FR | 1513478 A | 2/1968 |
| JP | 11-294619 A | 10/1999 |
| JP | 2001-235051 A | 8/2001 |
| JP | 2014177051 A | 9/2014 |
| KR | 10-0181332 B1 | 4/1999 |
| WO | WO 95-14874 A1 | 6/1995 |

* cited by examiner

WATER VALVE GUIDE TUBE WITH INTEGRATED WELD RING AND WATER VALVE INCORPORATING SAME

This invention generally relates to valves, particularly to solenoid actuated valves utilized in a fluid flow path, and more particularly to water valves.

BACKGROUND OF THE INVENTION

Contemporary water valves are utilized in a variety of applications, including but not limited to controlling water flow in appliances such as ice makers, humidifiers, etc. Such water valves may be solenoid actuated and are typically an assembly of components. In general, the contemporary water valve includes an operator body, i.e. a housing, having an inlet and an outlet and a flow path through the housing between the inlet and the outlet. A valve member assembly is interposed between the inlet and the outlet along the flow path to open the flow path so that water may flow through the housing from the inlet to the outlet, and close the flow path to prevent water from flowing through the housing from the inlet to the outlet.

The valve member assembly may take on a variety of forms. One example is a flexible diaphragm with an insert attached thereto. An example of such a configuration may be readily seen at U.S. Pat. No. 4,500,067 to Zukausky titled "Pilot Operated Low Flow Valve" the entire teachings and disclosures of which are incorporated herein by reference. Actuation of valve member assemblies of this type is achieved via an armature acted upon by a solenoid attached to the valve. More particularly, a guide tube is attached to the housing of the valve. The guide tube, as its name suggests, includes a tube having a closed end which contains and guides the armature. A spring is also included within the guide tube and biases the armature into contact with the valve member assembly.

A solenoid coil is attached to the exterior of the guide tube, and provides the electromagnetic force necessary to move the armature within the guide tube. The an extension of the guide tube extends in a generally cantilevered manner from a base of the guide tube.

There are a variety of ways to install the guide tube onto the housing. As one method, the guide tube may be installed on the housing via spin welding. This method involves holding the valve housing in a fixed orientation and rotating a spin ring which is placed over the guide tube at a fixed speed and number of rotations while also pushing the guide tube and spin ring into the housing at a pressure of 100-200 pounds typically. The housing, guide tube, and spin ring are made of plastic and they have a specific geometry that promotes melting of the material and allows for travel of expelled melted material. While this method has proven effective, it is not without its drawbacks.

For example, as stated above, this method of spin welding requires a dedicated spin ring in addition to the housing and guide tube. As a result, the spin ring forms a portion of the outer periphery of the valve in the region of the spin weld, driving up part size. This spin ring also drives up part count and cost of a water valve including the same. Further, because the spin welding method relies on the melting of material and material flow, the weld interface features must have tight tolerances to accurately and precisely control the amount of dimensional changes as a result of the melting of the material. Because the parts are typically molded plastic components, such tightly controlled tolerances of the weld features must be built in to the tooling for molding the parts, which drives up tooling cost and complexity.

Further, with spin welding, it can be difficult to achieve a specific angular orientation of the part being spun relative to the fixed part. This is particularly problematic in water valves, where there is a need to line up with the terminals of the solenoid. Still further, it can also be difficult to maintain a desired height tolerance of the guide tube (i.e. the extension) relative to the housing.

Indeed, it is difficult control the height of the guide tube given that it fuses to the housing by way of the melting of the material. Still further, it is possible for a leak path to develop at the interfacing surfaces of the spin ring, guide tube, and housing.

Another method of joining a guide tube to a housing typically used is ultrasonic welding. This method relies on frictional forces created by ultrasonic pulses to heat mating parts and weld the same at their interface. While this method does not require a spin ring, it is still dependent upon the melting of material at the weld interface between the guide tube and the housing. As a result, weld interface features must still be tightly toleranced at the tooling level to ensure the desired perpendicularity and height of the guide tube.

Another method of joining a guide tube to a housing relies on a threaded connection. With this method, the guide tube and housing each include molded-in threaded features which mate with one another. This method thus also requires tight tooling tolerances to ensure the threads have the appropriate pitch and threading geometry, and also the use of twisting cores in the tool. As is the case with the above methods, this also drives up tooling cost and complexity. Further, with this method it is possible to over turn the guide tube when the threading the same onto the housing. This can twist the diaphragm mounted within the housing, causing herniation of the diaphragm and ultimately a failure of the water valve prematurely.

Accordingly, there is a need in the art for an improved valve utilizing a guide tube and housing design as well as an improved method of manufacturing these components. The invention provides such improvements. These and other advantages of the invention, as well as additional inventive features, will be apparent from the description of the invention provided herein.

BRIEF SUMMARY OF THE INVENTION

In one aspect, the invention provides a water valve having a reduced part count and size over prior designs. An embodiment of a water valve according to this aspect includes a housing having an inlet and an outlet and a flow path extending through the housing between the inlet and the outlet. The water valve also includes a valve member assembly situated within the flow path and operable to selective open and close the flow path. The water valve also includes a guide tube mounted to the housing, and a solenoid actuator mounted to the guide tube. The guide tube includes a first mating surface arranged perpendicularly relative to a longitudinal axis of the guide tube. The housing includes a second mating surface arranged perpendicularly to a longitudinal axis of the housing. The first and second axially facing mating surfaces abut one another in a pre-bonded configuration of the water valve. The guide tube and housing form a joint at the outer periphery of the water valve in a post-bonded configuration.

In an embodiment according to this aspect, the guide tube is made of an optically clear material and the housing is made of an energy absorbent material.

In an embodiment according to this aspect, the guide tube includes a base and an extension extending from the base. The base extends between an upper and a lower surface. The first mating surface is provided by the lower surface. The housing includes an opening. The guide tube is received within the opening. The second mating surface circumscribes the opening. The extension extends from the upper surface of the base, and wherein an annular ring extends from the lower surface.

In an embodiment according to this aspect, the valve member assembly includes a diaphragm and a pilot element. The pilot element is mounted to the diaphragm. The annular ring radially and axially abuts a peripheral portion of the diaphragm.

In an embodiment according to this aspect, the base defines a diameter of the guide tube, and wherein the extension defines a height of the guide tube, wherein the diameter is at least half of the height.

In an embodiment according to this aspect, a plurality of reinforcing ribs extend from the upper surface of the base and reinforce the extension.

In an embodiment according to this aspect, the guide tube is laser welded directly to the housing.

In another aspect, the invention provides a water valve having a reduced cost and effort in its manufacture. An embodiment of a water valve according to this aspect includes a housing having an inlet and an outlet and a flow path extending through the housing between the inlet and the outlet. A valve member assembly is situated within the flow path and operable to selective open and close the flow path. A guide tube is mounted to the housing, and solenoid actuator is mounted to the guide tube. The guide tube is laser welded directly to the housing to form a joint between the guide tube and the housing at an outer periphery of the housing.

In an embodiment according to this aspect, the guide tube is made of an optically clear material and the housing is made of an energy absorbent material.

In an embodiment according to this aspect, the water valve has a pre-bonded configuration valve in which a first mating surface of the guide tube axially abuts a second mating surface of the housing. The joint is formed at the outer periphery of the housing in a post-bonded configuration of the water valve.

In yet another aspect, the invention provides a guide tube for a water valve. The water valve has a housing with an inlet, and outlet, and a flow path extending between the inlet and the outlet. The water valve also includes a solenoid actuator arranged to act upon an armature carried by the guide tube. The armature acts upon a valve member assembly of the water valve carried by the housing. An embodiment of a guide tube according to this aspect includes a base having an upper surface and a lower surface. An extension extends away from the upper surface. The extension has an internal bore therein. An annular ring extends from the lower surface of the base, radially interior of an outer peripheral edge of the base. The lower surface defines an axially facing mating surface. The mating surface arranged radially outward from the annular ring and extending to the outer peripheral edge of the base. The mating surface is configured to axially abut the housing to provide a laser weld joint.

In an embodiment according to this aspect, the guide tube is made of an optically clear material.

In an embodiment according to this aspect, a plurality of reinforcing ribs extend from the upper surface of the base and reinforce the extension.

In an embodiment according to this aspect, a plurality of mounting tabs extending upwardly from the base. The plurality of mounting tabs are configured to mount the solenoid actuator to the guide tube.

In an embodiment according to this aspect, the annular ring includes an axial abutment surface and a radial abutment surface, the axial and radial abutment surfaces configured to axially and radially abut the valve member assembly.

In yet another aspect, the invention provides a method for manufacturing a water valve. An embodiment of a method according to this aspect includes providing a housing having an inlet and an outlet and a flow path extending through the housing between the inlet and the outlet. The method also includes situating a valve member assembly within the flow path. The method also includes installing a guide tube to the housing by laser welding the guide tube directly to the housing. The method also includes mounting a solenoid actuator to the guide tube.

In an embodiment according to this aspect, the step of providing the housing includes providing an axially facing mating surface on an upper periphery of the housing. The step of providing the housing includes forming the housing using an energy absorbent material. The step of situating the valve member assembly within the flow path includes situating a diaphragm and a pilot element mounted to the diaphragm in an internal cavity of the housing.

In an embodiment according to this aspect, the step of installing the guide tube includes abutting an axially facing first mating surface formed on the guide tube with an axially facing second mating surface of the housing to form an interface, wherein a joint is formed at the interface after laser welding. The step of installing includes providing the guide tube formed with an optically clear material and providing the housing formed with an energy absorbent material. The step of installing includes directing a laser beam of a laser welder through the optically clear material of the guide tube and into the energy absorbent material of the housing.

In an embodiment according to this aspect, the step of installing includes forming the joint such that the joint is at an outer periphery of the water valve.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, an embodiment of a water valve according to the teachings herein is illustrated. The water valve overcomes existing problems in the art by utilizing laser welding to join a guide tube of the water valve to a housing of the water valve. Advantageously, an additional spin ring or the like is not required, unlike those prior designs above which utilize spin welding.

Indeed, flat axially facing mating surfaces are employed by the housing and the guide tube. As used herein, the term "axial" and its derivatives means in the direction of a longitudinal axis of the water valve. As used herein, the term "radial" means normal to the longitudinal axis. The aforementioned axially facing mating surfaces are configured to abut one another in a pre-bonded configuration of the water valve. As used herein, "pre-bonded" means prior to laser welding. In a post-bonded configuration, the mating surfaces may be partially obliterated via the welding process to form a contiguous joint. As used herein, the term "post-bonded" means after laser welding.

It has also been found by the applicant that the material flow at the interface of the laser weld joint is more predictable than prior methodologies, allowing for a tighter tolerance on guide tube height.

Figure 1:
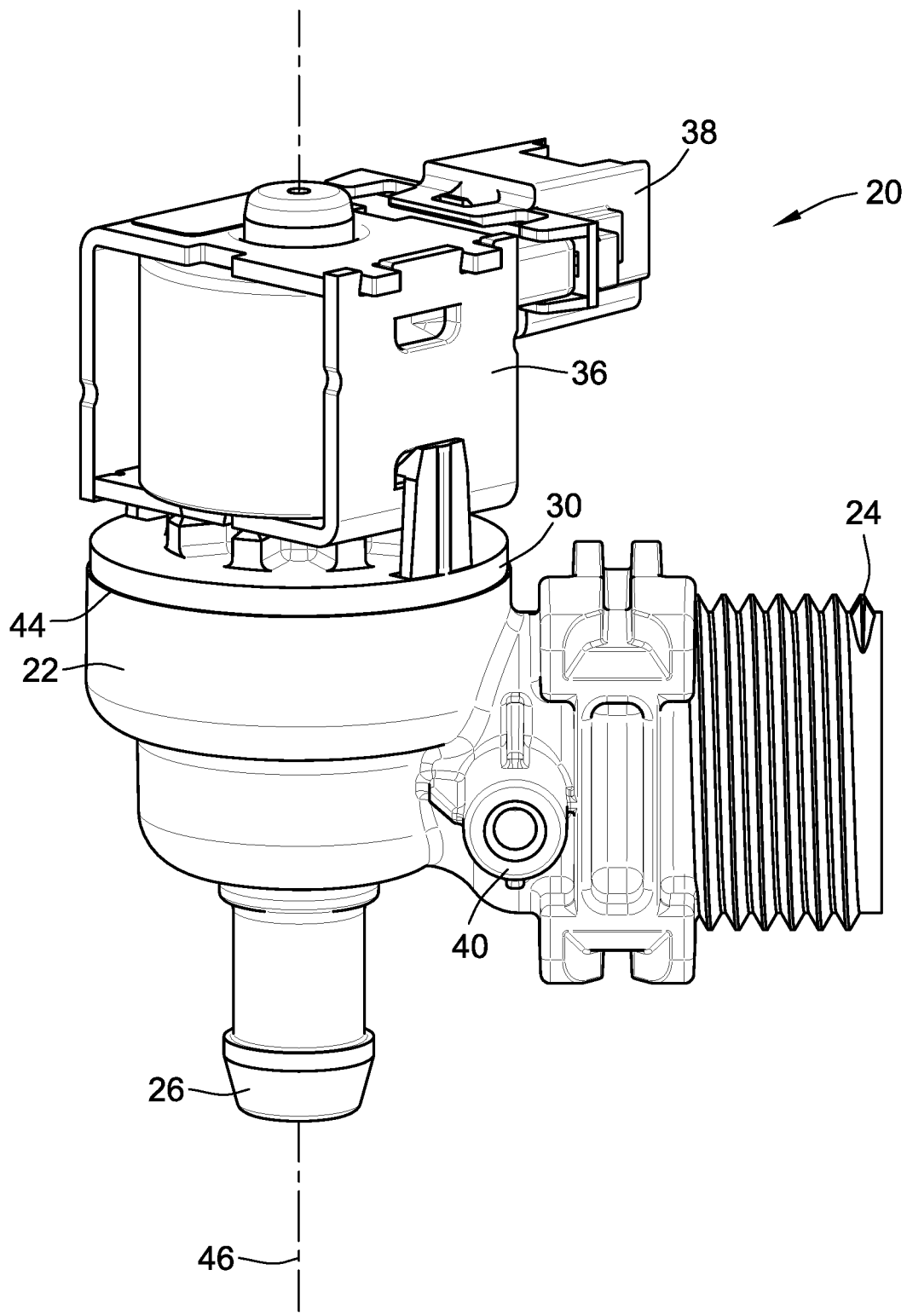
FIG. 1 is a perspective view of an embodiment of a water valve according to the teachings herein.

With particular reference now to FIG. 1, the same illustrates an exemplary embodiment of the above introduced water valve 20. Water valve 20 includes a housing 22 having an inlet 24 and an outlet 26. A flow path extends between inlet 24 and outlet 26. A valve member assembly (see FIG. 3) is situated within the flow path and operable to open and close the same to allow or prevent fluid flow between inlet 24 and outlet 26 through water valve 20. Water valve 20 also includes a guide tube 30 which is laser welded to housing 22. Guide tube 30 is used to contain an armature 32 (See FIG. 2) which is biased within an internal bore of guide tube 30 by a spring 34 (See FIG. 2). Spring 34 biases armature 32 against valve member assembly 28 to maintain water valve 20 in a closed position, i.e. position in which fluid flow between inlet 24 and outlet 26 is prevented.

Water valve 20 also includes a solenoid actuator 36 attached to guide tube 30. Solenoid actuator 36 includes contacts 38 for an electrical connection. Current applied to solenoid actuator 36 via the electrical connection 38 causes armature 32 to move within guide tube 30 against the biasing force of spring 34 to transition water valve 20 from the closed position to an open position in which water is permitted to flow between inlet 24 and outlet 26.

As briefly introduced above, guide tube 30 is laser welded to housing 22 to form a weld joint 44 on an exterior of water valve 20 at shown. Also as briefly introduced above, this use of laser welding advantageously allows for the omission of a spin ring unlike prior designs which utilize spin welding, and provides for enhanced perpendicularly and height tolerancing of guide tube 30 relative to housing 22.

As can also be seen in FIG. 1, housing 22 is threaded in the region of inlet 24 to allow for a threaded connection of an inlet supply line of water. Outlet 26 includes a hose barb style connection for connection of an outlet supply line for receiving a flow of water passing through water valve 20. Those of skill in the art will readily recognize that these threaded and hose barb connections may be omitted in favor of other connection styles without departure from the teachings of the invention herein.

Additionally, housing 22 includes a single mounting boss for mounting water valve 20 in its operational environment. However, this should be taken by way of example only as other mounting features may be utilized in place of mounting boss 40, or alternatively, more than a single mounting boss 40 may be employed.

Figure 2:
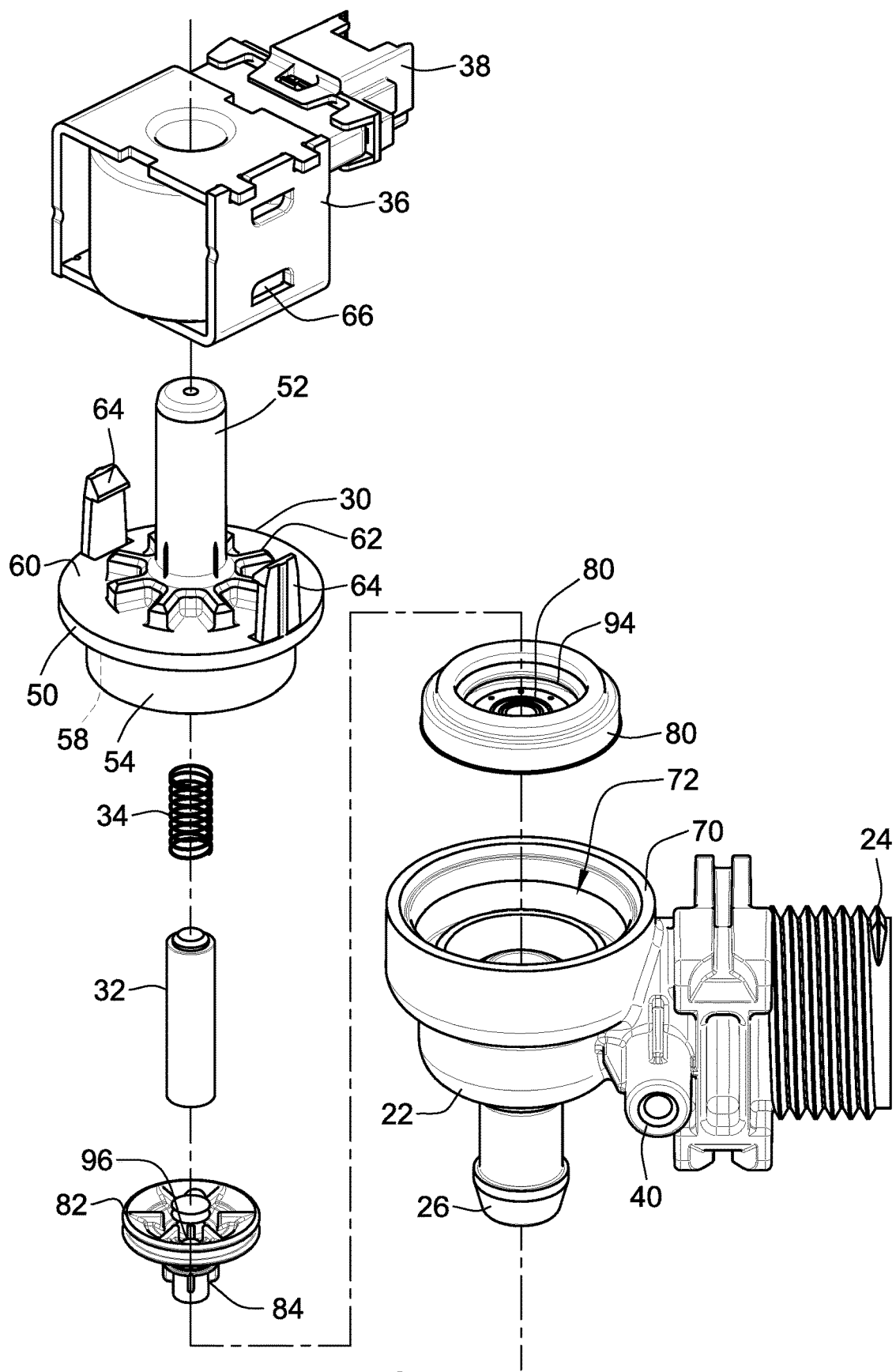
FIG. 2 is a perspective exploded view of the water valve of FIG. 1.

Turning now to FIG. 2, water valve 20 is illustrated in an exploded view. As can be seen in this view, guide tube 30 includes a circular base 50 with an extension 52 depending upwardly from base 50. More specifically, base 50 extends between lower and upper surfaces 58, 60. Extension 52 extends upwardly from upper surface 60. An annular ring 54 extends downwardly from lower surface 58. As we described in greater detail below, lower surface 58 defines a first mating surface used to mate with a second mating surface 70 formed on housing 22. Each mating surface 58, 70 is an axially facing mating surface in that it is arranged in a plane which is perpendicular to a longitudinal axis 46 (See FIG. 1) of water valve 20. With momentary reference to FIG. 1, this longitudinal axis 46 extends through outlet 26 as well as the length of guide tube 30.

Still referring to FIG. 2, a plurality of support ribs 62 are also formed on the upper surface 60 of base 50 and support guide tube 52 in its cantilevered extension. The number, shape, and extension of these ribs 62 may vary depending on the length of extension 52 and other factors. Additionally, a plurality of mounting tabs 64 extend from upper surface 60 of base 50. Mounting tabs 64 are used to hold solenoid actuator 36 against guide tube 30. In particular, mounting tabs 64 snap into corresponding slots 66 formed in the outer cage of solenoid actuator 36.

Turning now to valve member assembly 28 (see also FIG. 3), the same includes a flexible diaphragm 80 with a pilot member 82 mounted thereto. As discussed below relative to FIG. 3, diaphragm 80 is movable within an internal chamber 72 of housing 22 to open and close water valve 20. Armature 32 acts against pilot member 82 to apply a downward force against thereto to seat diaphragm 80 against a valve seat 86 within internal cavity 72 of housing 22, as described below. When solenoid actuator 36 is energized to move armature 32 upwardly within guide tube 30, armature 32 no longer exerts a downward force against pilot member 82 (as well as diaphragm 80 via their connection) thereby exposing a pilot passageway 102 (see FIG. 3). As a result, water pressure within cavity 72 acts upwardly against diaphragm 80 and water escapes an outlet cavity 92 via pilot passageway 102. This allows diaphragm 80 and pilot member 82 to continue to move upwardly, ultimately unseating them from valve seat 86 for full open flow.

Figure 3:
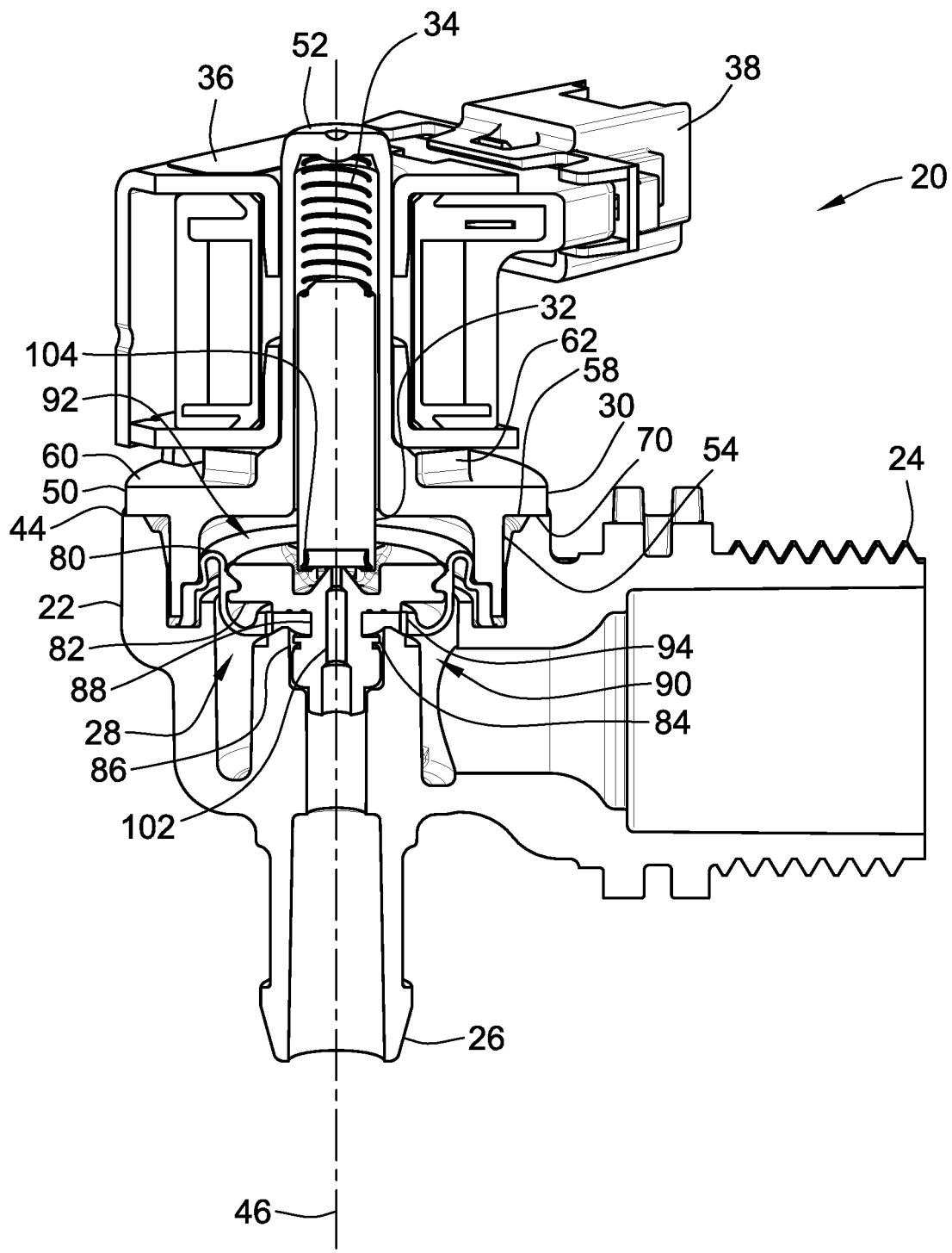
FIG. 3 is a perspective cross section of the water valve of FIG. 1.

Turning now to FIG. 3, water valve 20 is shown in a cross-section in the closed position. Armature 32 is biased by spring 34 against pilot member 82 such that diaphragm 80 seemingly contacts valve seat 86. As can be seen in this view, diaphragm 80 separates internal cavity 72 into an inlet cavity 90 and an outlet cavity 92 situated respectively on either side of diaphragm 80. In the closed position, water entering inlet 24 may proceed into inlet cavity 90. This water may then pass through diaphragm 80 by way of a plurality of passageways 94 formed through diaphragm 80. Similarly, a passageway 96 (See FIG. 2) is formed through pilot member 82. As such, in the closed position water entering inlet 24 is in fluid communication with both inlet chamber 90 and outlet chamber 92.

However, further flow of water through water valve 20 is prevented because armature 32, and more particularly seal member 104 installed in an end of armature 32, seals off a pilot passageway 102 through pilot member 82. Upon the application of electrical current to solenoid actuator 36, armature 32 is moved upward in FIG. 3 to unseat seal member 104 from pilot member 82 thereby exposing the uppermost opening of pilot passageway 102 to outlet chamber 92.

Because the water in outlet chamber 92 is pressurized at the same pressure as that of the water in inlet chamber 90, and assuming the pressure through outlet 26 and passageway 102 is less than that of inlet chamber 90, this water then proceeds to evacuate from outlet chamber 92 through passageway 102 to outlet 26. This causes a pressure differential on either side of diaphragm 80 such that the pressure in the inlet chamber 90 is greater than that of the pressure in outlet chamber 92. This pressure differential thus causes diaphragm 80 to unseat from valve seat 86 thereby fully exposing the opening surrounded by valve seat 86 to inlet chamber 90. This results in a full opening of water valve 20 allowing water to flow from inlet 24 through inlet chamber 92 the opening surrounded by valve seat 86 and out of outlet 26.

It should also be noted that because an extension portion 84 which is received through the opening surrounded by valve seat 86 is fixedly retained by an opening 88 in diaphragm 80, pilot number 82 moves upwardly with diaphragm 80 when transitioning from the closed position to the open position.

Figure 4:
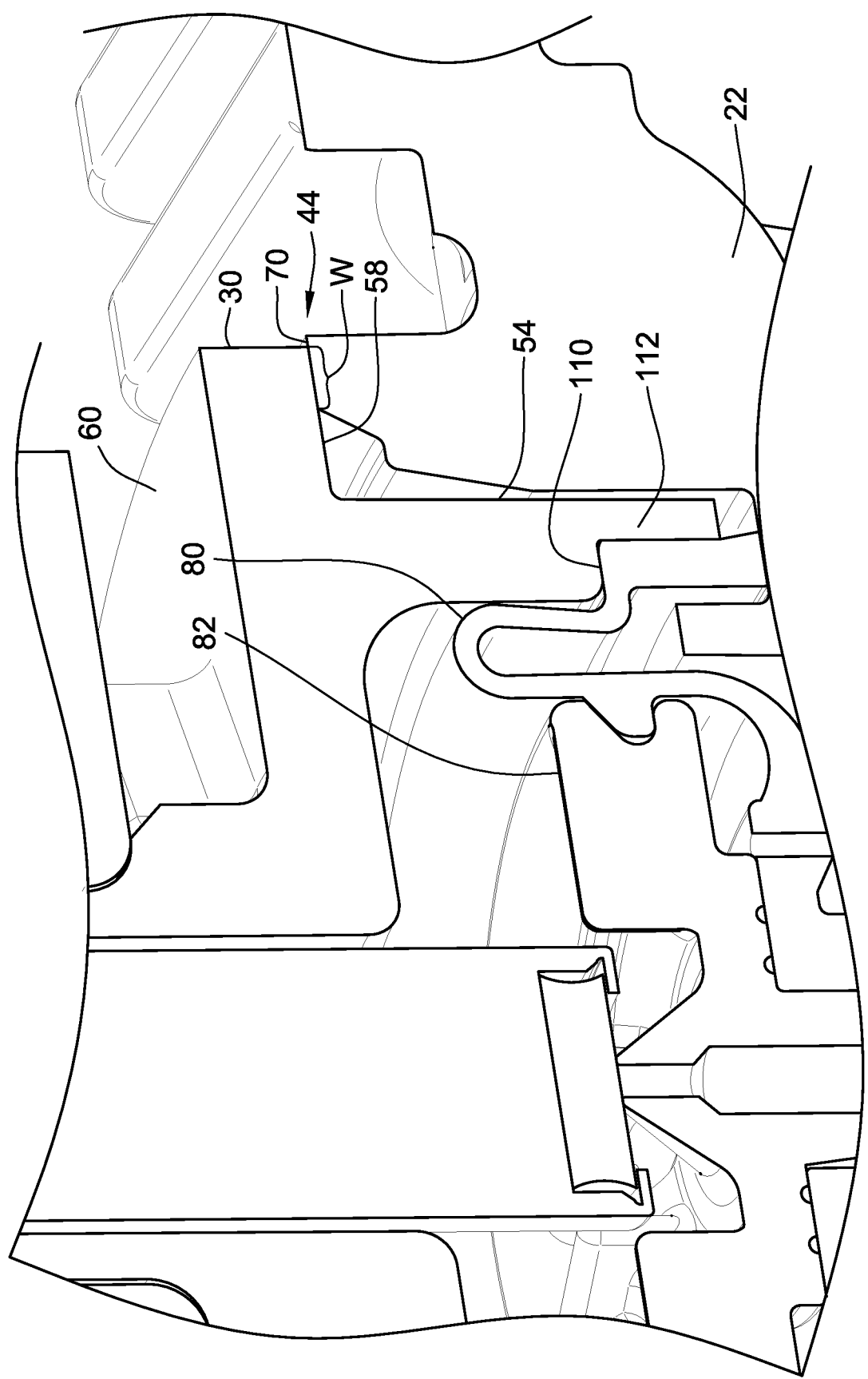
FIG. 4 is a partial perspective cross section of the water valve of FIG. 1, in the region of a joint formed via laser welding.

Turning now to FIG. 4, the particulars of the laser weld between guide tube 30 and housing 22 will be described in greater detail. Indeed, to join guide tube 30 to housing 22, mating surfaces 58 and 70 are axially abut. Additionally, an axial abutment surface 110 and a radial abutment surface 112 are brought into contact with diaphragm 80 to locate the same. A laser welding operation is then applied at the interface of mating surfaces 58, 70 to form a weld joint 44 at the exterior of water valve 20. As a result, a region of overlap W between mating surfaces 58, 70 is fused and becomes a contiguous material after welding. This may result in the complete obliteration of mating surface 70 such that the sidewall of housing 22 in this region is contiguous with base 50 of guide tube 30. Alternatively, depending on weld settings, mating surface 70 may remain partially intact with the remainder thereof being fused with base 50 as described above.

To optimize the laser welding process, it is desirable to form guide tube 30 out of an optically clear material. As used herein, "optically clear" means a material which is optically clear to a laser, regardless of whether the same is clear to the human eye. Such material advantageously allows minimal to no diffusion of laser light which passes therethrough. It is also advantageous to form housing 22 of an energy absorbent material such that the same is optimized for energy absorption during the laser welding process. This allows for the abrupt softening of the material in the region of second mating surface 70 of housing 22. Heat is then transferred to guide tube 30 in this region to melt a portion thereof and fuse these components together into the contiguous material described above. As an example, housing 22 could be natural in color or natural with colorant added. Further, housing 22 could also be natural in color with a carbon black material added. It will be recognized that all of the examples above have the advantage of providing an energy absorbing material which absorbs the laser energy as it passes through the optically clear material of guide tube 30.

It will be recognized that such welding may be applied in a top-down manner such that the laser used in the laser welding process must first pass through guide tube 30 before reaching housing 22. Alternatively, laser welding could be performed in the radial direction in which the laser contacts base 30 and housing 22 simultaneously at the interface thereof.

In an exemplary embodiment of a method of manufacturing a water valve according to the teachings herein, housing 22 is first provided by way of molding. However, it is also possible to form housing by way of additive manufacturing, or more traditional machining methods. Valve member assembly 28 is then situated within an internal cavity 72 of housing 22. Guide tube 30 is then situated against housing 22 such that the above described radial and axial abutment of annular ring 54 and diaphragm 80 is achieved, as well as the axial abutment of mating services 58, 70. Guide tube 30 is then laser welded to housing 22 to form weld joint 44 which is exposed on an exterior of water valve 20. A solenoid actuator is then mounted to guide tube 30 as discussed above.

As can be seen from the foregoing general description of the method, a spin ring is not employed. Further, complex geometry on the housing and/or the guide tube is not necessary to achieve the weld herein. Instead, simple flat surfaces which meet with one another are utilized. As a result, a highly efficient, low part count, low cost water valve is provided.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A water valve, the water valve comprising:
a housing having an inlet and an outlet and a flow path extending through the housing between the inlet and the outlet;
a valve member assembly situated within the flow path and operable to selective open and close the flow path;
a guide tube, the guide tube mounted to the housing;
a solenoid actuator mounted to the guide tube;
wherein the guide tube includes an axially facing first mating surface arranged perpendicularly relative to a longitudinal axis of the guide tube and wherein the housing includes an axially facing second mating surface arranged perpendicularly to a longitudinal axis of the housing;
wherein the first and second axially facing mating surfaces abut one another in a pre-bonded configuration of the water valve; and
wherein the guide tube and housing form a joint at the outer periphery of the water valve in a post-bonded configuration.

2. The water valve of claim 1, wherein the guide tube is made of an optically clear material.

3. The water valve of claim 1, wherein the guide tube includes a base and an extension extending from the base, the base extending between an upper and a lower surface, wherein the first mating surface is provided by the lower surface.

4. The water valve of claim 3, wherein the housing includes an opening, the guide tube received within the opening, and wherein the second mating surface circumscribes the opening.

5. The water valve of claim 3, wherein extension extends from the upper surface of the base, and wherein an annular ring extends from the lower surface.

6. The water valve of claim 5, wherein the valve member assembly includes a diaphragm and a pilot element, the pilot element mounted to the diaphragm, wherein the annular ring radially and axially abuts a peripheral portion of the diaphragm.

7. The water valve of claim 3, wherein the base defines a diameter of the guide tube, and wherein the extension defines a height of the guide tube, wherein the diameter is at least half of the height.

8. A water valve, the water valve comprising:
a housing having an inlet and an outlet and a flow path extending through the housing between the inlet and the outlet;
a valve member assembly situated within the flow path and operable to selectively open and close the flow path;
a guide tube, the guide tube mounted to the housing;
a solenoid actuator mounted to the guide tube;
wherein the guide tube includes an axially facing first mating surface arranged perpendicularly relative to a longitudinal axis of the guide tube and wherein the housing includes an axially facing second mating surface arranged perpendicularly to a longitudinal axis of the housing;
wherein the first and second axially facing mating surfaces abut one another in a pre-bonded configuration of the water valve;
wherein the guide tube and housing form a joint at the outer periphery of the water valve in a post-bonded configuration;
wherein the guide tube includes a base and an extension extending from the base, the base extending between an upper and a lower surface, wherein the first mating surface is provided by the lower surface; and
wherein a plurality of reinforcing ribs extend from the upper surface of the base and reinforce the extension.

9. A water valve, the water valve comprising:
a housing having an inlet and an outlet and a flow path extending through the housing between the inlet and the outlet;
a valve member assembly situated within the flow path and operable to selective open and close the flow path;
a guide tube, the guide tube mounted to the housing; a solenoid actuator mounted to the guide tube; and
wherein the guide tube is laser welded directly to the housing to form a joint between the guide tube and the housing at an outer periphery of the housing.

10. The water valve of claim 9, wherein the guide tube is made of an optically clear material.

11. The water valve of claim 10, wherein the water valve has a pre-bonded configuration valve in which a first mating surface of the guide tube axially abuts a second mating surface of the housing, and wherein the joint is formed at the outer periphery of the housing in a post-bonded configuration of the water valve.

12. A guide tube for a water valve, the water valve having a housing with an inlet, and outlet, and a flow path extending between the inlet and the outlet, the water valve also including a solenoid actuator arranged to act upon an armature carried by the guide tube, the armature acting upon a valve member assembly of the water valve carried by the housing, the guide tube comprising:
a base having an upper surface and a lower surface;
an extension extending away from the upper surface, the extension having an internal bore therein;
an annular ring extending from the lower surface of the base, radially interior of an outer peripheral edge of the base; and
wherein the lower surface defines an axially facing mating surface, an abutment surface arranged radially outward from the annular ring to the outer peripheral edge of the base, the abutment surface configured to axially abut the housing to provide a laser weld joint.

13. The guide tube of claim 12, wherein the guide tube is made of an optically clear material.

14. The guide tube of claim 12, further comprising a plurality of mounting tabs extending upwardly from the base, the mounting tabs configured to mount the solenoid actuator to the guide tube.

15. The guide tube of claim 12, wherein the annular ring includes an axial abutment surface and a radial abutment surface, the axial and radial abutment surfaces configured to axially and radially abut the valve member assembly.

16. A guide tube for a water valve, the water valve having a housing with an inlet, and outlet, and a flow path extending between the inlet and the outlet, the water valve also including a solenoid actuator arranged to act upon an armature carried by the guide tube, the armature acting upon a valve member assembly of the water valve carried by the housing, the guide tube comprising:
a base having an upper surface and a lower surface;
an extension extending away from the upper surface, the extension having an internal bore therein;

an annular ring extending from the lower surface of the base, radially interior of an outer peripheral edge of the base;

wherein the lower surface defines an axially facing mating surface, an abutment surface arranged radially outward from the annular ring to the outer peripheral edge of the base, the abutment surface configured to axially abut the housing to provide a laser weld joint; and wherein a plurality of reinforcing ribs extend from the upper surface of the base and reinforce the extension.

17. A method for manufacturing a water valve, the method comprising the steps of:
providing a housing having an inlet and an outlet and a flow path extending through the housing between the inlet and the outlet;
situating a valve member assembly within the flow path;
installing a guide tube to the housing by laser welding the guide tube directly to the housing; and
mounting a solenoid actuator to the guide tube.

18. The method of claim 17, wherein the step of providing the housing includes providing an axially facing mating surface on an upper periphery of the housing.

19. The method of claim 18, wherein the step of situating the valve member assembly within the flow path includes situating a diaphragm and a pilot element mounted to the diaphragm in an internal cavity of the housing.

20. The method of claim 17, wherein the step of installing the guide tube includes abutting an axially facing first mating surface formed on the guide tube with an axially facing second mating surface of the housing to form an interface, wherein a joint is formed at the interface after laser welding.

21. The method of claim 20, wherein the step of installing includes providing the guide tube formed with an optically clear material and providing the housing formed with an energy absorbent material.

22. The method of claim 21, wherein the step of installing includes directing a laser beam of a laser welder through the optically clear material of the guide tube and into the energy absorbent material of the housing.

23. The method of claim 20, wherein the step of installing includes forming the joint such that the joint is at an outer periphery of the water valve.

* * * * *